US011507358B2

(12) United States Patent
Watt et al.

(10) Patent No.: US 11,507,358 B2
(45) Date of Patent: Nov. 22, 2022

(54) METHOD AND APPARATUS FOR CHANGE AUTOMATION

(71) Applicant: Dell Products L.P., Round Rock, TX (US)

(72) Inventors: James Watt, Austin, TX (US); Bhaskar Todi, Indore (IN)

(73) Assignee: Dell Products L.P., Round Rock, TX (US)

( * ) Notice: Subject to any disclaimer, the term of this patent is extended or adjusted under 35 U.S.C. 154(b) by 106 days.

(21) Appl. No.: 17/144,589

(22) Filed: Jan. 8, 2021

(65) Prior Publication Data

US 2022/0222052 A1    Jul. 14, 2022

(51) Int. Cl.
| | |
|---|---|
| G06F 8/61 | (2018.01) |
| H04L 67/02 | (2022.01) |
| H04L 67/1097 | (2022.01) |
| G06F 8/71 | (2018.01) |

(52) U.S. Cl.
CPC .................. *G06F 8/61* (2013.01); *G06F 8/71* (2013.01); *H04L 67/02* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 2008/0104581 | A1* | 5/2008 | Clemm | G06F 8/71 717/162 |
| 2010/0100970 | A1* | 4/2010 | Roy-Chowdhury | H04L 67/55 726/1 |
| 2012/0117532 | A1* | 5/2012 | Knepper | G06F 8/60 717/176 |
| 2020/0019493 | A1* | 1/2020 | Ramakrishna | G06F 11/3688 |
| 2021/0141718 | A1* | 5/2021 | Sandhu | G06F 8/60 |
| 2021/0397712 | A1* | 12/2021 | Gajananan | G06F 21/51 |
| 2022/0131865 | A1* | 4/2022 | Lev Ran | H04L 63/102 |

* cited by examiner

*Primary Examiner* — Marina Lee
(74) *Attorney, Agent, or Firm* — Daly, Crowley Mofford & Durkee, LLP

(57) ABSTRACT

A method, comprising: receiving, by an admission controller, a deployment object associated with code that is desired to be deployed to a production system; detecting, by a first responder, whether the deployment object is associated with a change ticket and, when the deployment object is not associated with a change ticket, submitting a change ticket that is associated with the deployment object, the change ticket being submitted by the first responder; detecting, by a second responder, whether the change ticket, that is associated with the deployment object, is allowed, and, when the change ticket is allowed, authorizing a deployment of the code, the deployment being authorized by the second responder; and deploying the code to a production system when the deployment of the code has been authorized by the second responder, the code being deployed by the admission controller.

20 Claims, 7 Drawing Sheets

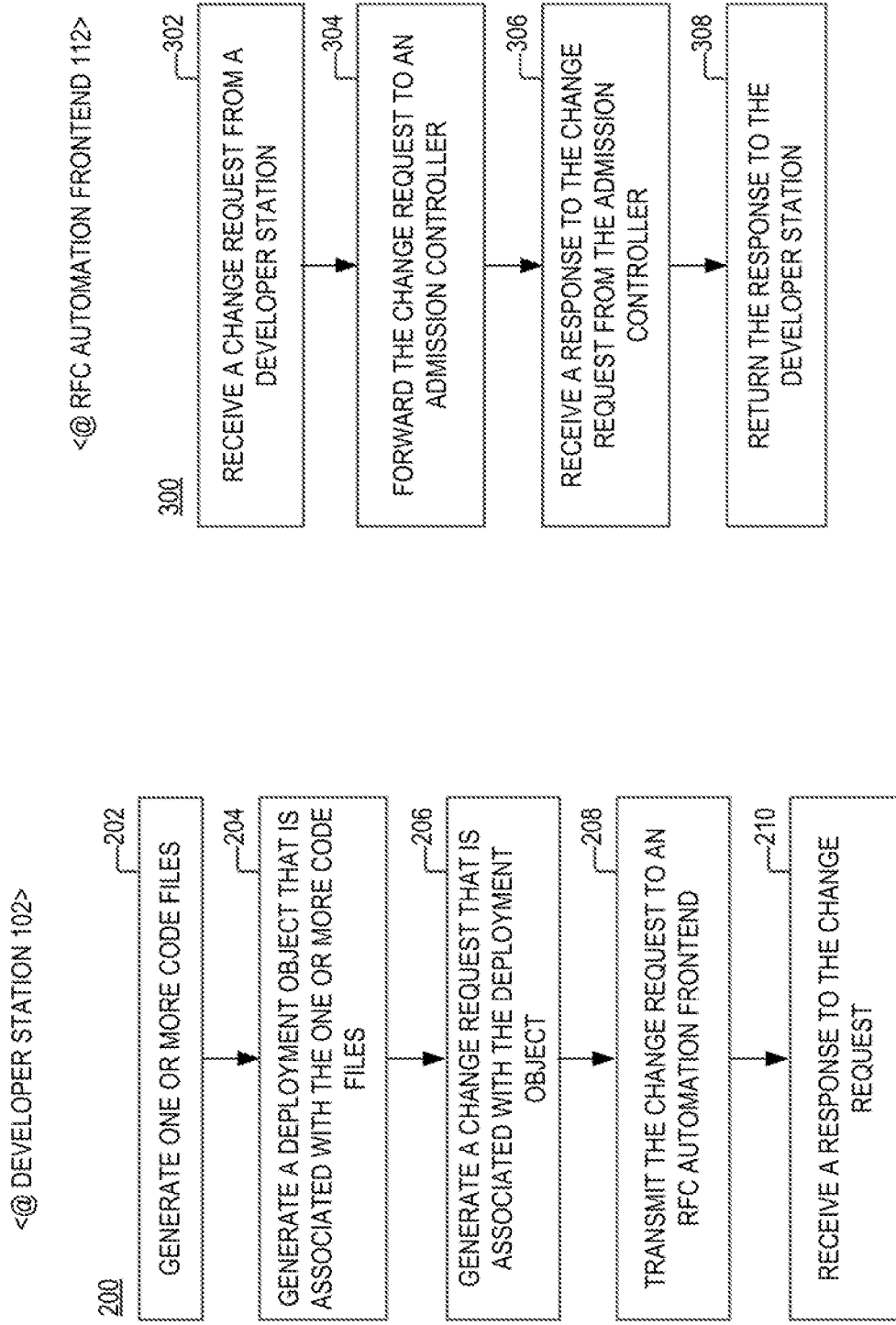

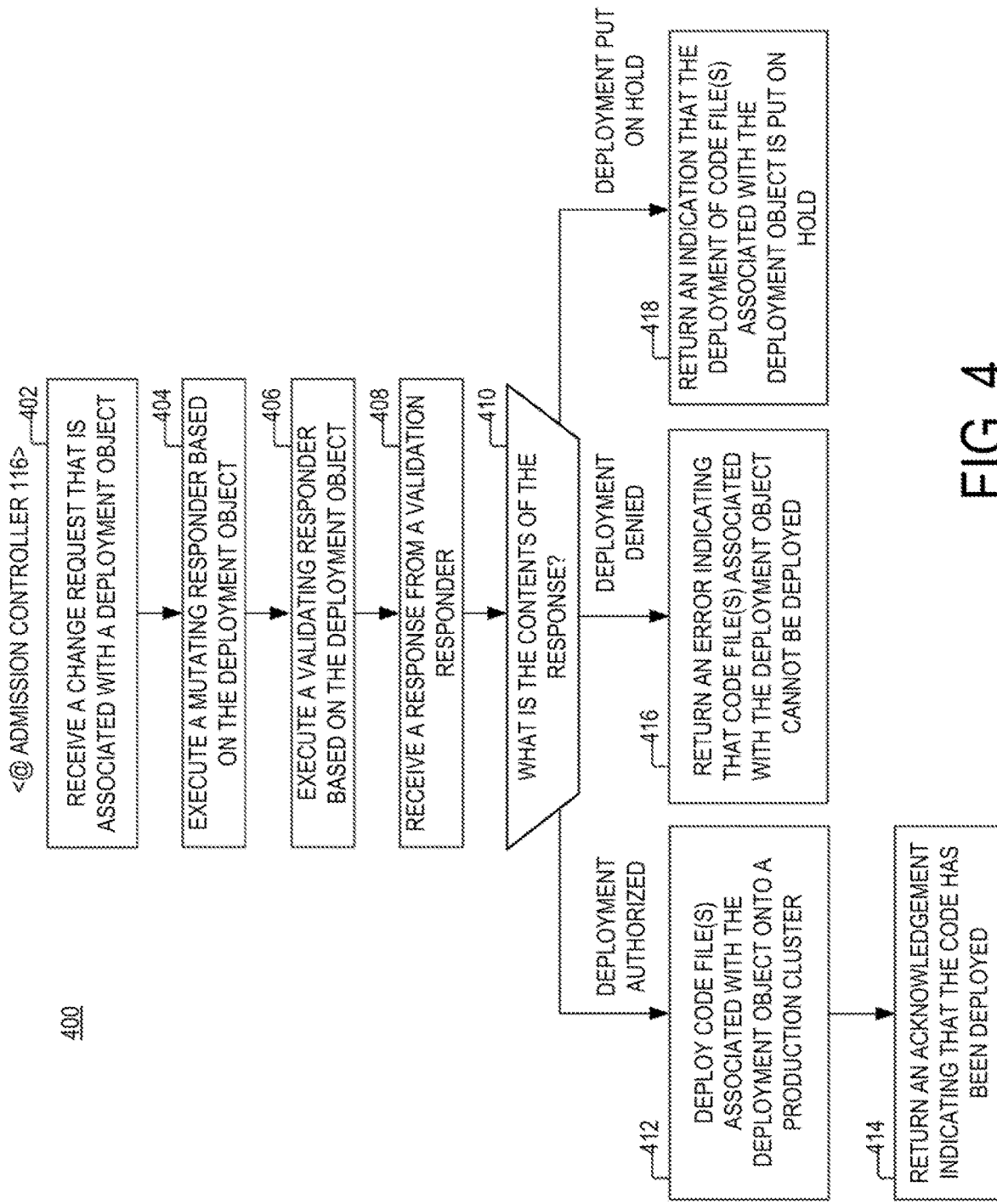

METHOD AND APPARATUS FOR CHANGE AUTOMATION

BACKGROUND

Change control systems are utilized in large scale enterprise environments to allow upper management visibility and control across their entire IT footprint. These change control systems typically manage asset change workflow and approvals. Additionally, these systems are needed to show compliance with government and industry standards during audits that can have significant business impact if not met.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided, comprising: receiving, by an admission controller, a deployment object associated with code that is desired to be deployed to a production system; detecting, by a first responder, whether the deployment object is associated with a change ticket and, when the deployment object is not associated with a change ticket, submitting a change ticket that is associated with the deployment object, the change ticket being submitted by the first responder; detecting, by a second responder, whether the change ticket, that is associated with the deployment object, is allowed, and, when the change ticket is allowed, authorizing a deployment of the code, the deployment being authorized by the second responder; and deploying the code to a production system when the deployment of the code has been authorized by the second responder, the code being deployed by the admission controller.

According to aspects of the disclosure, a system is provided, comprising: a memory; and at least one processor operatively coupled to the memory, the at least one processor being configured to perform the operations of: receiving, by an admission controller, a deployment object associated with code that is desired to be deployed to a production system; detecting, by a first responder, whether the deployment object is associated with a change ticket and, when the deployment object is not associated with a change ticket, submitting a change ticket that is associated with the deployment object, the change ticket being submitted by the first responder; detecting, by a second responder, whether the change ticket, that is associated with the deployment object, is allowed, and, when the change ticket is allowed, authorizing a deployment of the code, the deployment being authorized by the second responder; and deploying the code to a production system when the deployment of the code has been authorized by the second responder, the code being deployed by the admission controller.

According to aspects of the disclosure, a non-transitory computer-readable medium is provided that stores one or more processor executable instructions, which, when executed by at least one processor, cause the at least one processor to perform the operations of: receiving, by an admission controller, a deployment object associated with code that is desired to be deployed to a production system; detecting, by a first responder, whether the deployment object is associated with a change ticket and, when the deployment object is not associated with a change ticket, submitting a change ticket that is associated with the deployment object, the change ticket being submitted by the first responder; detecting, by a second responder, whether the change ticket, that is associated with the deployment object, is allowed, and, when the change ticket is allowed, authorizing a deployment of the code, the deployment being authorized by the second responder; and deploying the code to a production system when the deployment of the code has been authorized by the second responder, the code being deployed by the admission controller.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 2 is a flowchart of an example of a process, according to aspects of the disclosure;

FIG. 3 is a flowchart of an example of a process, according to aspects of the disclosure;

FIG. 4 is a flowchart of an example of a process, according to aspects of the disclosure;

DETAILED DESCRIPTION

Figure 1:
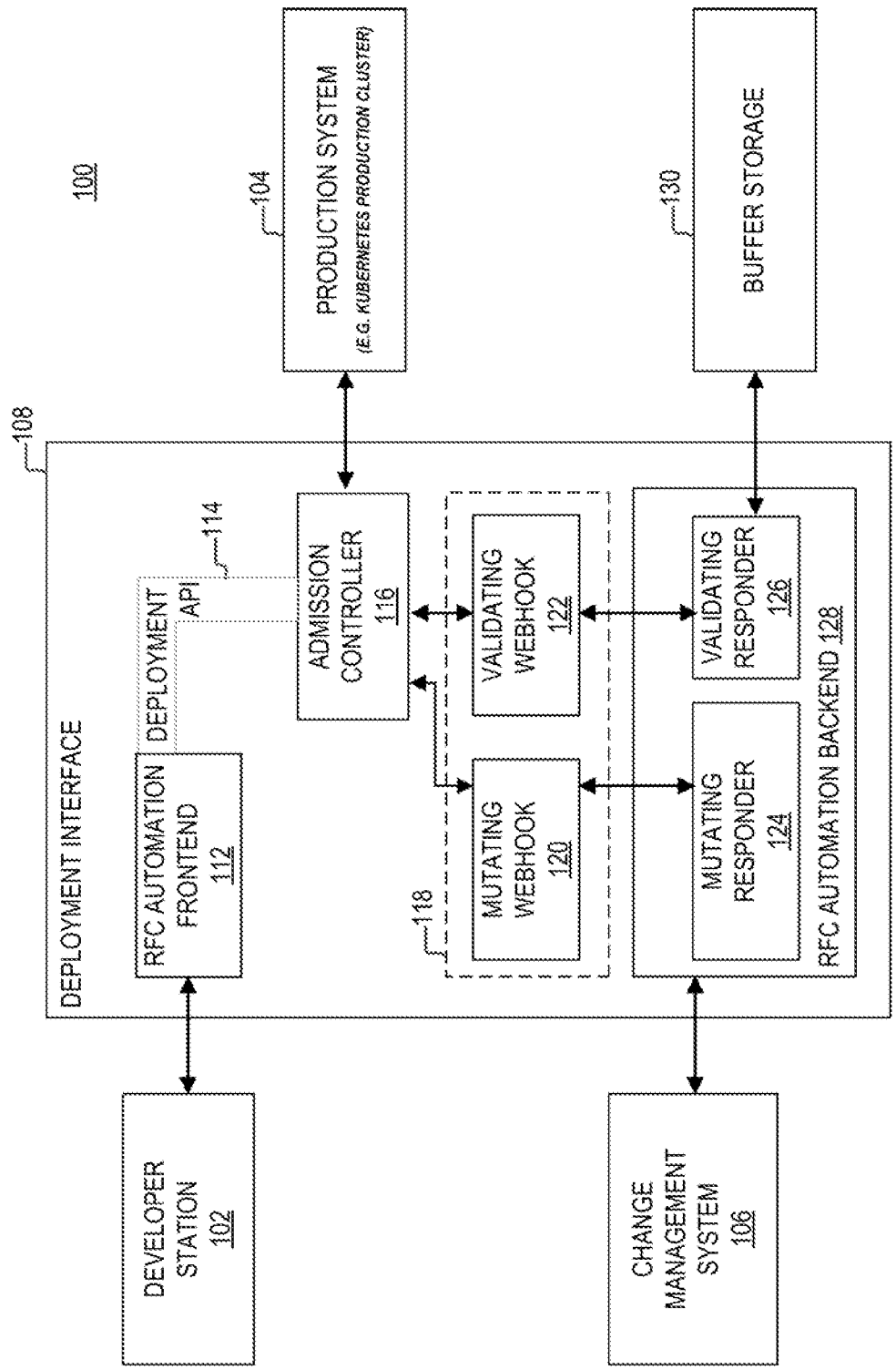
FIG. 1 is a diagram of an example of a system, according to aspects of the disclosure.

FIG. 1 is a diagram of an example of a system 100, according to aspects of the disclosure. The system 100 may include a developer station 102, a production system 104, a change management system 106, and a deployment interface 108. The developer station 102 may include a laptop, a desktop, and smartphone, and/or any other suitable type of computing device. The production system 104 may include a laptop, a desktop, a smartphone, and/or any other suitable type of computing device. Additionally or alternatively, in some implementations, the production system 104 may include a distributed computing system. Additionally or alternatively, in some implementations, the production system 104 may include a production cluster, such as a Kubernetes production cluster. The developer station 102 may be used by a software developer to write code, which is subsequently deployed on the production system 104. The disclosure that follows provides an example of a process and/or system for deploying code from the developer station 102 onto the production system 104.

The change management system 106 may include any suitable type of system that is configured to control, track, and manage the documentation and implementation of change requests. In some implementations, the change management system 106 may include a ServiceNow (SNOW)

system. However, it will be understood that the present disclosure is not limited to any specific implementation of the change management system 106. Although in the example of FIG. 1, the change management system 106 is configured to manage the deployment of code onto the production system 104, it will be understood that alternative implementations are possible in which the change management system 106 is arranged to control the deployment of code on multiple production systems (e.g., on multipipe production clusters).

In some implementations, the change management system 106 may use change tickets to manage and/or control the deployment of code on the production system 104. For example, when a developer wants to change existing code or deploy new code on the production system 104, the developer may submit a change ticket for the deployment. The change ticket may be filed (or submitted) with the change management system 106. Afterwards, the change ticket may be reviewed by a manager (or reviewed automatically). Following the review, the change ticket may be either approved or denied. If the change ticket is approved, the developer is permitted to proceed with the deployment of code onto the production system 104. Otherwise, if the change ticket is denied, the developer is not permitted to proceed with the deployment of code.

As used throughout the disclosure, the term "change request" shall refer to a request, which, if executed, causes a change in the state of a production system, such as the production system 104. For example, a change request may be a request that causes the deployment (e.g., installation and possibly execution) of code onto to the production system. As another example, a change request may be a request that causes a change in a container that is deployed on the production system. As yet another example, the change request may be a request that causes a new container to be deployed on the production system. Change requests are used in the context of software development. When a developer works on code, the developer may deploy the code onto a production system by submitting a change request for the code.

Change requests are managed and controlled by the change management system 106 through the use of change tickets. As used throughout the disclosure, the term "change ticket" may refer to an entry in a database that is used by the change management system 106 to track a change request. Additionally or alternatively, in some implementations, the term change ticket may refer to metadata that is embedded in a deployment object, and which is used to track the status of a request for change that is associated with the code deployment. Additionally or attentively, in some implementations, the term "change ticket" may refer to a receipt (or another similar object) that is returned by the code deployment system.

A change request may be associated with a deployment object. The deployment object may include a .yaml file and/or any other object that identifies code that is desired to be deployed. The deployment object may be encapsulated or otherwise referenced by the deployment object. The deployment object may identify one or more of: (i) file path(s) of the code that is desired to be deployed, (ii) the production system where the code is desired to be deployed, (iii) a particular container instance where the code is desired to be deployed, and/or any other suitable type of information that is normally needed by an orchestrated container system (or another computing system) to deploy code to production.

One disadvantage of existing mechanisms for change control is that they could delay the time it takes to deploy code to production. Few people on engineering teams may have access or training to submit change requests, and this could delay the submission of official releases. Another disadvantage of existing mechanisms for change control is that they can be easily bypassed by developers. For example, change control mechanisms can be circumvented if the developers gain access to production credentials/certificates which allow them to deploy code to production directly. In traditional systems, this is mitigated by requiring integration with accounts that have rotating keys/passwords for direct manual access, but many service accounts used for deployment automation maintain persistent production access. In container orchestration systems like Kubernetes, active directory (AD) authentication may not always be available, and persistent access of the developer's continued integration/continued development (CI/CD) pipelines via automated accounts remains a possible source of uncontrolled and undocumented change. Furthermore, developers often enjoy a high degree of control over their CI/CD pipelines and can circumvent change control systems if they want to.

The deployment interface 108 can make it harder (or ideally impossible) to circumvent the change control mechanism of the system 100. Furthermore, in some implementations, the deployment interface 108 may reduce (or eliminate) the need for manual submission of change tickets. According to the present example, the production system 104 is part of an orchestrated container system, such as Kubernetes, and the deployment interface 108 provides controls over how code is deployed to production on the orchestrated container system. However, it will be understood that the concepts and ideas disclosed herein apply to any suitable type of computing system, and they are not limited to being used on orchestrated container systems only. According to the present disclosure, an orchestrated system may include a system that is configured to host and manage container orchestrator stacks. In an orchestrated container system, an application can be built up of several containerized components or microservices, which are aligned carefully for the application to run as intended.

The deployment interface 108 may include a request for change (RFC) automation frontend 112, a deployment API 114, an admission controller 116, an interface suite 118, and an RFC automation backend 128. The operation of the RFC automation frontend 112 is discussed in further detail with respect to FIG. 3. The deployment API 114 may include an API that is called when a change request is received at the RFC automation frontend 112. Calling the deployment API 114 may start a process in which it is the change request is validated, and completed (subject to successful validation). In some implementations, the deployment API may include the Kubernetes API.

In some implementations, on cluster creation, or on inclusion of the cluster into change control, the administrator of the production system 104 may push the interface suite 118, the RFC automation backend 128, and the RFC automation frontend 112 into the production system 104. The interface suite 118, the RFC automation backend 128, and the RFC automation frontend 112 can be configured on deployment with various behavioral settings such as required application information for interacting with the change control system, as well as potential overrides and/or annotations required for resources (e.g., Kubernetes resources) being deployed to the cluster.

The admission controller 116 may include a process (or service) that governs and enforces how the production system 104 is used. In some implementations, the admission controller 116 may be configured to determine whether a change request should be executed by deploying, on the production system 104, code that is associated with the change request. In some implementations, the admission controller 116 may include an admission controller of an orchestrated container system, such as a Kubernetes admission controller. However, it will be understood that the present disclosure is not limited to any specific implementation of the admission controller 116.

The RFC automation backend 128 may include a mutating responder 124 and a validating responder 126. The RFC automation backend 128 may be coupled to the admission controller 116 via the interface suite 118. The interface suite 118 includes a mutating webhook 120 and a validating webhook 122. The mutating webhook 120 may be configured to connect the admission controller 116 to the mutating responder 124 (i.e., configured to execute or otherwise call the mutating responder 124 in response to a request from the admission controller 116). The validating webhook 120 may be configured to connect the admission controller 116 to the validating responder 126 (i.e., configured to execute or otherwise call the validating responder 124 in response to a request from the admission controller 116).

In some implementations, the mutating responder 124 may include one or more processes (and/or services) that are configured to: (i) detect whether a change ticket has been submitted for a given deployment object by the developer and (ii) submit a change ticket for the given deployment object on behalf of the developer, if the developer has not already done so. In some implementations, the mutating responder may be configured to execute a process 500, which is discussed further below with respect FIG. 5. Additionally or alternatively, in some implementations, the mutating responder 124 may modify the given deployment object further to enforce security policies (e.g., modify resource requests to fit within namespace limits), augment the deployment object (or associated code) with default resource requests. Additionally or alternatively, in implementations, in which the system 100 is part of an orchestrated container system, such as a Kubernetes system, the mutating responder may perform any other action that is customarily performed by mutating responders in orchestrated container systems.

Figure 6A:
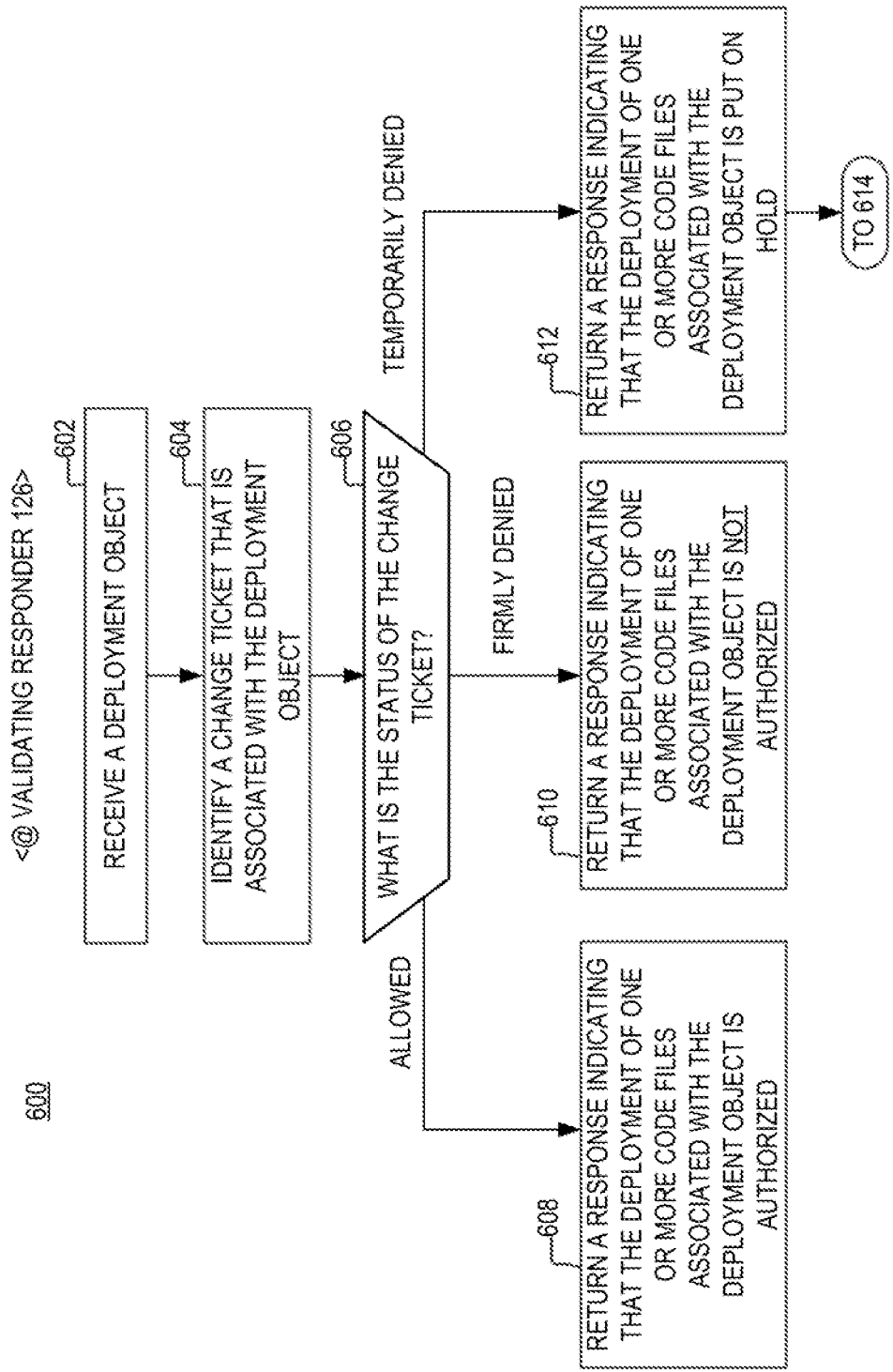
FIG. 6A is a flowchart of an example of a process, according to aspects of the disclosure.
Figure 6B:
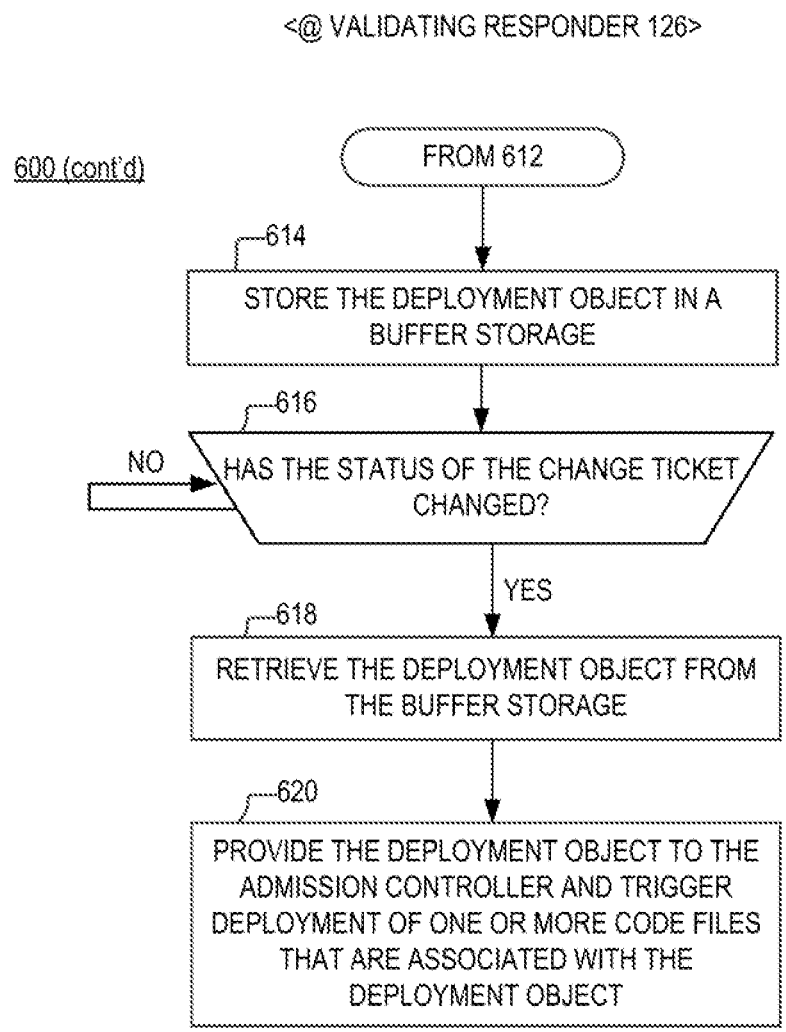
FIG. 6B is a flowchart of an example of a process, according to aspects of the disclosure.

In some implementations, the validating responder 126 may include one or more processes (and/or services) that are configured to determine whether a given deployment object is permitted to be deployed. In some implementations, the validating responder 126 may execute a process 600, which is discussed further below with respect to FIGS. 6A-6B, to determine whether a change ticket associated with the deployment object has been allowed. Additionally or alternatively, in some implementations, the validating responder 126 may perform various additional checks, such as detecting whether a user is authorized to make a change, whether the change is affecting the namespace assigned to the user or has a larger scope, whether the change is affecting a critical resource, etc.

In some implementations, the deployment interface 108 may be executed on a computing device, such as the computing device 700, which is discussed further below with respect to FIG. 7. Additionally or alternatively, in some implementations, the deployment interface may be executed on a distributed computing system including a plurality of computing devices.

The buffer storage 130 may include a storage directory, a solid-state drive, a network-attached storage (NAS), a random-access memory (RAM), a volatile memory, a non-volatile memory, and/or any other suitable type of logical and/or physical storage device. As is discussed further below, in some implementations, the buffer storage 130 may be used to temporarily store deployment objects corresponding to change tickets that have been put on hold.

Although in the example of FIG. 1, the RFC automation backend 128 is executed on the same device as the admission controller 116, it will be understood that alternative implementations are possible in which the RFC automation backend 128 is executed remotely. Although in the example of FIG. 1, the deployment interface 108 is configured to coordinate the deployment of code on only one production system, it will be understood that alternative implementations are possible in which the deployment interface 108 is configured to coordinate the deployment of code on multiple production systems. Such a production systems may operate a large retail website and/or any other suitable type of enterprise system. In this regard, it will be understood that using the deployment interface 108 allows the coordination of changes (e.g., code deployments) across hundreds and even thousands of clusters.

FIG. 2 is a flowchart of an example of a process 200 that is performed by the developer station 102, according to aspects of the disclosure. At step 202, the developer station generates one or more code files. Any of the code files may include a text file (that includes source code or a script), a binary file, and/or any other suitable type of file. At step 204, the developer station generates a deployment object that is associated with the one or more code files. The deployment object may include a configuration file, such as a .yaml file, and/or any other suitable type of deployment object. As noted above, the deployment object may include an indication of where the one or more source code files are stored and/or any other information that is needed for the deployment of the one or more code files onto the production system 104. At step 206, the developer station 102 transmits a change request that is associated with the deployment object. In some implementations, the change request may include a request to create a new container or a request to update an existing container. Additionally or alternatively, the deployment request can be issued by using a CI/CD system, an automated script, or manually. Additionally or alternatively, in some implementations, the change request may include a request to deploy the one or more code files onto the production system 104. The change request may include or otherwise reference the deployment object (generated at step 204). At step 208, the developer station 102 provides the change request to the RFC automation frontend 112. At step 210, the developer station 102 receives a response to the change request. The response may include at least one of: (i) an acknowledgment indicating that the one or more code files have been deployed onto the production system 104, (ii) an error indicating that the deployment of the one or more code files has been refused, and (iii) an on-hold receipt indicating that the change request has been put on hold. In some implementations, the on-hold receipt may include a file and/or another object that contains information, which uniquely identifies the change request, and permits the developer station 102 to track the status of the change request.

FIG. 3 is a flowchart of an example of a process 300 that is performed by the RFC automation frontend 112. At step 302, the RFC automation frontend 112 receives the change request (transmitted at step 208). At step 304, the RFC automation frontend 112 forwards the change request to the admission controller 116. In some implementations, forwarding the change request to the admission controller 116 may include placing a call to the deployment API 114, which causes the change request (generated at step 206) and/or deployment object (generated at step 204) to be provided to the admission controller 116. At step 306, the RFC automation frontend receives, from the admission controller 116, a response to the change request. At step 308, the RFC automation frontend 112 forwards the response to the developer station 102.

FIG. 4 is a flowchart of a process 400 for executing a change request by the admission controller 116, according to aspects of the disclosure.

At step 402, the admission controller 116 receives the change request (generated at step 206). Receiving the change request may include one or more of receiving the deployment object (generated at step 204) and/or a pointer to the deployment object. Additionally or alternatively, in some implementations, receiving the change request may include detecting that the RFC automation frontend 112 has placed an API call (with the deployment API 114) for the deployment of code on the production system 104.

At step 404, the admission controller 116 executes the mutating responder 124 based on the deployment object. Executing the mutating responder 124 may include calling the mutating webhook 120. Calling the mutating webhook 120 may cause the mutating webhook 120 to provide the deployment object (and/or the change request) to the mutating responder 124 and trigger the execution of the mutating responder 124. In some implementations, executing the mutating responder 124 may cause the deployment object to be modified (or mutated) by the mutating responder 124. Alternatively, in some implementations, executing the mutating responder 124 may leave the deployment object unchanged.

At step 406, the admission controller 116 executes the validating responder 126 based on the deployment object. Executing the validating responder 126 may include calling the validating webhook 122. Calling the validating webhook 122 may cause the validating webhook 122 to provide the deployment object to the validating responder 126 and trigger the execution of the validating responder 126. In some implementations, executing the validating responder 126 may cause the validating responder 126 to evaluate the deployment object and determine whether the code files (generated at step 202) are authorized to be deployed on the production system 104.

At step 408, the admission controller 116 receives a response from the validating responder 126. The response may be generated by the validating responder based on the deployment object (received at step 402). The response may indicate that one of the following is true: (i) the deployment of the code files (generated at step 202) is authorized, (ii) the deployment of the code files (generated at step 202) is denied, and (iii) the deployment of the code files (generated at step 202) is put on hold. When the deployment is put on hold, the response may optionally include an on-hold receipt.

At step 410, the admission controller 116 determines the contents of the response (received at step 408). If the deployment of the code (generated at step 202) is authorized, the process 400 proceeds to step 412. If the deployment of the code (generated at step 202) is denied, the process 400 proceeds to step 414. And if the deployment of the code (generated at step 202) is put on hold, the process 400 proceeds to step 404.

At step 412, the admission controller deploys the code files (generated at step 202) on the production system 104.

At step 414, the admission controller 116 returns (to the RFC automation frontend 112) an acknowledgment indicating that the code files have been deployed successfully. The acknowledgment may be returned by placing a call to the deployment API 114. Upon receipt of the acknowledgment at the RFC automation frontend 112, the acknowledgment may be forwarded to the developer station 102.

At step 416, the admission controller 116 returns (to the RFC automation frontend) an error indicating that the deployment of the code files (generated at step 202) has been refused. The error may be returned by placing a call to the deployment API 114. Upon receipt of the error at the RFC automation frontend 112, the error may be forwarded to the developer station 102.

At step 418, the admission controller 116 returns (to the RFC automation frontend) an indication that the deployment of the code files (generated at step 202) has been put on hold. The indication may include a message indicating that the deployment has been put on hold. Additionally or alternatively, the indication may include an on-hold receipt, if such is provided by the validating responder 126. The indication may be returned by placing a call to the deployment API 114. Upon receipt of the indication at the RFC automation frontend 112, the indication may be forwarded to the developer station 102.

Figure 5:
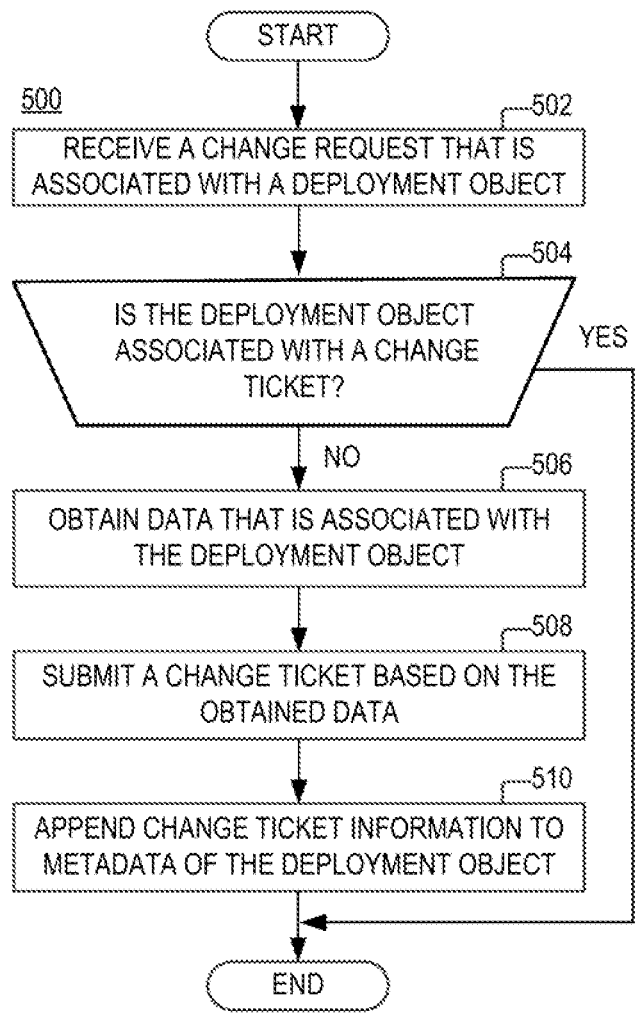
FIG. 5 is a flowchart of an example of a process, according to aspects of the disclosure.

FIG. 5 is a flowchart of a process 500 that is performed by the mutating responder 124 when the mutating responder 124 is executed based on a deployment object, according to aspects of the disclosure.

At step 502, the mutating responder 124 receives the deployment object (generated at step 204). Receiving the deployment object may include receiving the deployment object itself or receiving a pointer to the deployment object.

At step 504, the mutating responder 124 detects whether the deployment object is associated with a change ticket. If the deployment object is associated with a change ticket (e.g., if a change ticket has already been submitted by the developer), the process 500 ends. Otherwise, if the deployment object is not associated with the change ticket (e.g., if the developer has not submitted a change ticket), the process 500 proceeds to step 506.

Detecting whether the deployment object is associated with a change ticket may include detecting whether the deployment object (generated at step 204) is associated with a change ticket and/or detecting whether the change request (generated at step 206) is associated with a change ticket. In some implementations, the mutating responder 124 may search the object metadata to determine whether a change ticket has been filed for the deployment object (and/or change request that is associated with the deployment object). Additionally or alternatively, in some implementations, the mutating responder 124 may query the change management system 106 to determine whether a change ticket has already been submitted for the deployment object (and/or change request associated with the deployment object). Additionally or alternatively, in some implementations, the mutating responder 124 may query another database (e.g., a database that is internal to the RFC automation backend 128) to determine whether the deployment object (and/or change request associated with the deployment object) is associated with a change ticket. Stated succinctly the present disclosure is not limited to any specific method for detecting whether a deployment object is associated (directly or indirectly) with a change ticket.

At step 506, the mutating responder 124 retrieves data associated with the deployment object. The data may be retrieved from the deployment object or a configuration map that is associated with the deployment object.

At step 508, the mutating responder 124 submits a change ticket for the deployment object to the change management system 106. Submitting a change ticket for the deployment object may include submitting a change ticket that is associated with the deployment object (generated at step 204) and/or submitting a change ticket that is associated with the change request (generated at step 204). The change ticket may be submitted in a well-known fashion. Stated succinctly, the present disclosure is not limited to any specific method that is associated (directly or indirectly) with a deployment object.

At step 510, the mutating responder 124 appends information associated with the change ticket to metadata of the deployment object. The appended information may include an identifier of the change ticket, an identifier of the production system where the deployment object is requested to be deployed, and/or any other suitable information that is part of or otherwise associated with the change ticket.

The present disclosure is not limited to any specific technique for determining whether a deployment object is associated with a change ticket (at step 504) and/or obtaining data that is associated with the deployment object (at step 506). By way of example, the data associated with a deployment object and/or a corresponding change ticket may identify which application/team the deployment object belongs to, what is the change associated with the deployment object, and what resources/objects does the change affect. Such information may be logged into the change management system 106 and used for auditing purposes.

The data associated with the deployment object may be obtained in a number of ways. For instance, when the deployment object includes a .yaml file, data that is stored in one or more fields of the .yaml file may be used to query the change management system 106 to determine whether a change ticket exists for the deployment object. Additionally or alternatively, the data associated with the deployment object may be derived from the configuration and/or environment context of the deployment interface 108. For instance, when the deployment interface 108 is instantiated, it may be configured to have a certain context. For instance, the production system 104 might belong to a 'search application' team and when the mutating responder 124 (and/or deployment interface 108) is deployed, reasonable defaults for finding 'search application' change tickets could be seeded into the configuration files of mutating responder 124 (and/or deployment interface 108), such as app team ID, production system ID, etc. Such information may also be used to locate whether the change management system 106 has a change ticket matching the deployment object (or used to generate a new change ticket).

Additionally or alternatively, the data associated with the deployment object may be generated (e.g., in real-time) by the mutating responder 124 and/or another component of the deployment interface (e.g., admission controller 116, etc.) When the deployment interface 108 is deployed, the configuration file of the deployment interface 108 could identify app team ID, production system ID, and/or other configuration information. As noted above, the deployment interface 108 may be configured to request the creation of a new change ticket if one does not yet exist. In this case, it could read the deployment object (e.g., yaml file) for change details (i.e. application versions, target namespaces, etc.) and use its internal configuration information (e.g., app id, etc.) to generate sufficient change information to post to the change management system 106. Kubernetes does provide features for giving a 'diff' of changes, so when the production system 104 is a Kubernetes cluster, the Kubernetes diff results for the proposed deployment could be attached to a new change ticket generated, and submitted on behalf of the application team by using the application team's information (e.g., information about a team of developers) that is contained in the deployment interface's 108 own specific configuration. Additionally or alternatively, the deployment interface 108 could hold multiple teams/applications change data and ID's and determine whose queue the ticket needs to be created in by examining deployment targets and/or the kinds of resources being changed. For example, all deployments affecting a 'search' namespace would result in a change ticket being generated in a 'search' team's change ticket queue in the change management system 106. Or possibly, all deployments affecting network resources could generate change tickets in a 'network operations' specific change queue.

FIG. 6 is a flowchart of a process 600 that is performed by the validating responder 126 when the validating responder is executed based on a deployment object, according to aspects of the disclosure.

At step 602, the validating responder 126 receives the deployment object (i.e., the deployment object that is generated at step 206 and possibly modified at step 404.) Receiving the deployment object may include receiving the deployment object itself or receiving a pointer to the deployment object. In some implementations, the deployment object may be received from the admission controller 116.

At step 604, the validating responder 126 identifies a change ticket that is associated with the deployment object. The change ticket may be identified by querying the change management system 106 and/or searching a predetermined database. Additionally or alternatively, the change ticket may be identified based on metadata that is embedded (e.g., at step 510) in the deployment object. As noted above, a change ticket may be associated with a deployment object when the change ticket is associated with either an identifier of the deployment object and/or an identifier of a deployment request that uses the deployment object.

At step 606, the validating responder 126 identifies the status of the change ticket. The status of the change ticket may be one of 'allowed', 'firmly denied', and 'temporarily denied'. When the status of the change ticket is 'allowed', this indicates that the one or more code files (generated at step 202) are permitted to be deployed onto the production system 104. When the change ticket is 'firmly denied', this indicates that the one or more code files (generated at step 202) are not permitted to be deployed (e.g., by the change management system 106) onto the production system 104 (e.g., unless the code files and/or deployment object are modified, etc.) When the change ticket is 'temporarily denied', this indicates that the one or more code files (generated at step 202) are not currently permitted to be deployed (e.g., by the change management system 106) onto the production system 104, but may be deployed at a later time (e.g., deployed without any additional modification of the one or more code files and/or deployment object).

At step 608, the validating responder 126 transmits, to the admission controller 116, a response indicating that the deployment of the one or more code files (generated at step 202) is authorized. The response may be transmitted via the validating webhook 122. In some implementations, the validating responder 126 may also log and document (e.g., in the change management system 106) the change to the production system 104 that is effectuated by the deployment of the one or more code files. Additionally or alternatively, in some implementations, the validating responder 126 may mark the change ticket that is associated with the deployment object (generated at step 204) as completed.

At step 610, the validating responder 126 transmits, to the admission controller 116, a response indicating that the deployment of the one or more code files (generated at step 202) is denied. The response may be transmitted via the validating webhook 122. In some implementations, the validating responder 126 may mark the change ticket that is associated with the deployment object (generated at step 204) as completed.

At step 612, the validating responder 126 transmits, to the admission controller 116, a response indicating that the deployment of the one or more code files (generated at step 202) is put on hold. The response may be transmitted via the validating webhook 122. The response may include a message that indicates that the deployment is put on hold. Additionally or alternatively, the response may include an on-hold receipt. The receipt may include a file and/or any other suitable type of object that contains information that allows the developer to track the status of the deployment object. In some implementations, the receipt may be a Kubernetes custom resource definition (CRD).

At step 614, the validating responder stores the deployment object (generated at step 204) in the buffer storage 130.

At step 616, the validating responder 126 determines if the status of the change ticket (identified at step 604) has changed. If the status has changed, the process 600 proceeds to step 618. Otherwise, if the status of the change ticket remains the same (as determined at step 306), step 616 is executed again.

At step 618, the validating responder 126 retrieves the deployment object (generated at step 202) from the buffer storage 130.

At step 620, the validating responder 126 provides the deployment object to the admission controller and/or notifies the admission controller that the one or more code files (generated at step 202) can now be deployed onto the production system 104. In some implementations, the validating responder 126 may generate a new change request that is associated with the deployment object (generated at step 202 and retrieved at step 618), and provide the new change request to the admission controller 116. In response to the new change request, the admission controller 116 may execute the process 400 again. Additionally or alternatively, in some implementations, the validating responder 126 may provide the deployment object to the admission controller 116. Additionally or alternatively, in some implementations, the validating responder 126 may place a call to the deployment API 114, which causes the admissions controller to deploy the one or more code files (generated at step 202) to the production system 104. In some implementations, the call to the deployment API 114 may take the deployment object as an input parameter.

In some implementations, at step 620, the validating responder 126 may also log and document (e.g., in the change management system 106) the change to the production system 104 that is effectuated by the deployment of the one or more code files. Additionally or alternatively, in some implementations, the validating responder 126 may mark (at step 620) the change ticket that is associated with the deployment object (generated at step 204) as completed.

As noted above, at step 616, the validating responder 126 determines whether the status of the change ticket has changed. The change ticket, as noted above, is associated with the deployment object (generated at step 204) and the change request (generated at step 206). In some respects, determining whether the status of the change ticket has changed may include detecting whether the status of the change ticket has changed from 'denied' to 'allowed'. Additionally, or alternatively, in some implementations, determining whether the status of a change ticket has changed may include detecting whether a moratorium, which blocks the completion of the change request, has been lifted. Additionally, or alternatively, in some implementations, determining whether a particular deployment window has become open.

The present disclosure is not limited to any specific method for determinizing whether the status of a change ticket has changed. In some implementations, the validating responder 126 may periodically poll the change management system 106 to determine whether the status of the change management ticket has changed. Additionally or alternatively, in some implementations, the validating responder 126 may periodically poll for an approval event that is generated by the change management system 106. Additionally or alternatively, in some implementations, the validating responder 126 may synchronize state information with the change management system 106 on a regular basis and cache a moratorium or no change status. Caching a moratorium status may include storing a first value in a memory of the validating responder 126 (or elsewhere), which indicates whether there is currently a moratorium in force over the deployment of code on the production system 104. Caching a no change status may include storing one or more second value(s) in a memory of the validating responder 126 (or elsewhere), which indicate whether there is currently a deployment window policy in force which allows the deployment of code on the production system 104 only during a particular time period. The one or more values may also identify the time period (i.e., identify the time when the deployment window is open). In some implementations, the first and second value(s) may be used internally by validating responder 126 to determine whether a moratorium has ended, whether a deployment window policy is still in force, and/or whether a particular deployment window has become open.

As noted above, at step 606, the validating responder 126 determines the status of a change ticket. In some implementations, the validating responder 126 may determine the status of the change ticket based on a cached no change status and/or a cached moratorium status. Additionally or alternatively, in some implementations, the validating responder 126 may determine the status of the change ticket by submitting a query to the change management system 106 and/or periodically polling the change management system. In response to the query, the validating responder 126, the validating responder 126 may receive a response. The response may contain information indicating whether the change ticket has been reviewed (or otherwise evaluated). If the change ticket has been evaluated, the response may include an indication of whether the change ticket is allowed or denied. If the change ticket is denied, the response may include a reason for the denial.

By way of example, in some implementations, the validating responder 126 may process the response to determine whether the change ticket is 'firmly denied' or 'temporarily denied.' For example, if the response indicates that the change ticket has not been evaluated yet (e.g., by a human manager or automatically), the validating responder 126 may determine that the change ticket is temporarily denied. As another example, if the response indicates that the change ticket has been reviewed (e.g., by a human manager or automatically) and a decision has been made to deny the change ticket because of a policy violation, the validating responder 126 may determine that the change ticket is firmly denied. As yet another example, if the response ticket indicates that the change ticket has been denied because of an ongoing moratorium on code deployments to the production system 104, the validating responder 126 may determine that the change ticket is temporarily denied. As yet another example, if the response indicates that the change ticket is denied because the change request is transmitted (at step 202) outside of a predetermined deployment window, the validating responder 126 may determine that the change ticket is temporarily denied.

According to the present disclosure, a moratorium is a ban on the deployment of code to the production system 104 that is enacted by management. A moratorium may be enacted to prevent disruptions in the operation of the production system and/or for any other reason. According to the present disclosure, a deployment window is a time period in which the deployment of code on the production system 104 is permitted. When a deployment window policy is in force, change requests that are submitted outside of the deployment window may be denied.

According to the present disclosure, moratorium and deployment window policies are enacted through the change management system 106. However, alternative implementations are possible in which moratorium and deployment window policies are enacted through the validating responder 126. Although in the example of FIGS. 1-6, the validating responder 126 interacts with the change management system 106 to determine the status of the change ticket (identified at step 604), alternative implementations are possible in which the validating responder 126 uses a database that is internal to the RFC automation backend 128 to determine the status of the change ticket. Stated succinctly, the present disclosure is not limited to any specific method for determining the status of a change ticket.

As discussed above, the deployment interface 108 uses the buffer storage 130 to buffer deployment objects. The use of the buffer storage 130 adds a fire-and-forget quality to the operation of the deployment interface 108. For instance, when a change request is submitted by a developer during a moratorium, a conventional system may require the developer to re-submit the request after the moratorium is over. By contrast, the deployment interface 108 may wait until the moratorium is over, and complete the change request once the moratorium is over, without any further action on part of the developer. As another example, when a change request is submitted outside of a deployment window, a conventional system may require the developer to re-submit the request during the deployment window. By contrast, the deployment interface 108 may wait until the deployment window starts, and complete the change request once the deployment window has started, without any further action on part of the developer. Moreover, as noted above, the use of the deployment interface 108 is advantageous because it enforces compliance with change policies by automatically submitting change tickets for change requests in which the developers have failed to obtain a change ticket beforehand.

In another aspect, the provision of the buffer storage 130 enables the deployment interface 108 to perform both synchronous and asynchronous changes into the production system 104, depending on who is requesting the deployment of code, what application and/or namespace the deployment is being applied to, etc. For instance, any deployment marked as low risk can be effectuated immediately, whereas changes that have significant risk or impact may need to wait for approval by management. As can be readily appreciated, the buffer storage 130 provides a location where deployment object associated with changes that have significant risk or impact can be cached until approval by management is obtained.

Moreover, the deployment interface 108 makes possible coordination of multiple enterprise clusters (or other types of production systems). Using an integrated change control system allows for synchronization of change across hundreds or thousands of production clusters (e.g., Kubernetes clusters). Global policies such as, 'only applications at Class III or lower may make changes during Black Friday weekend' can be implemented in the change control system and will be automatically enforced by the deployment interface 108.

Figure 7:
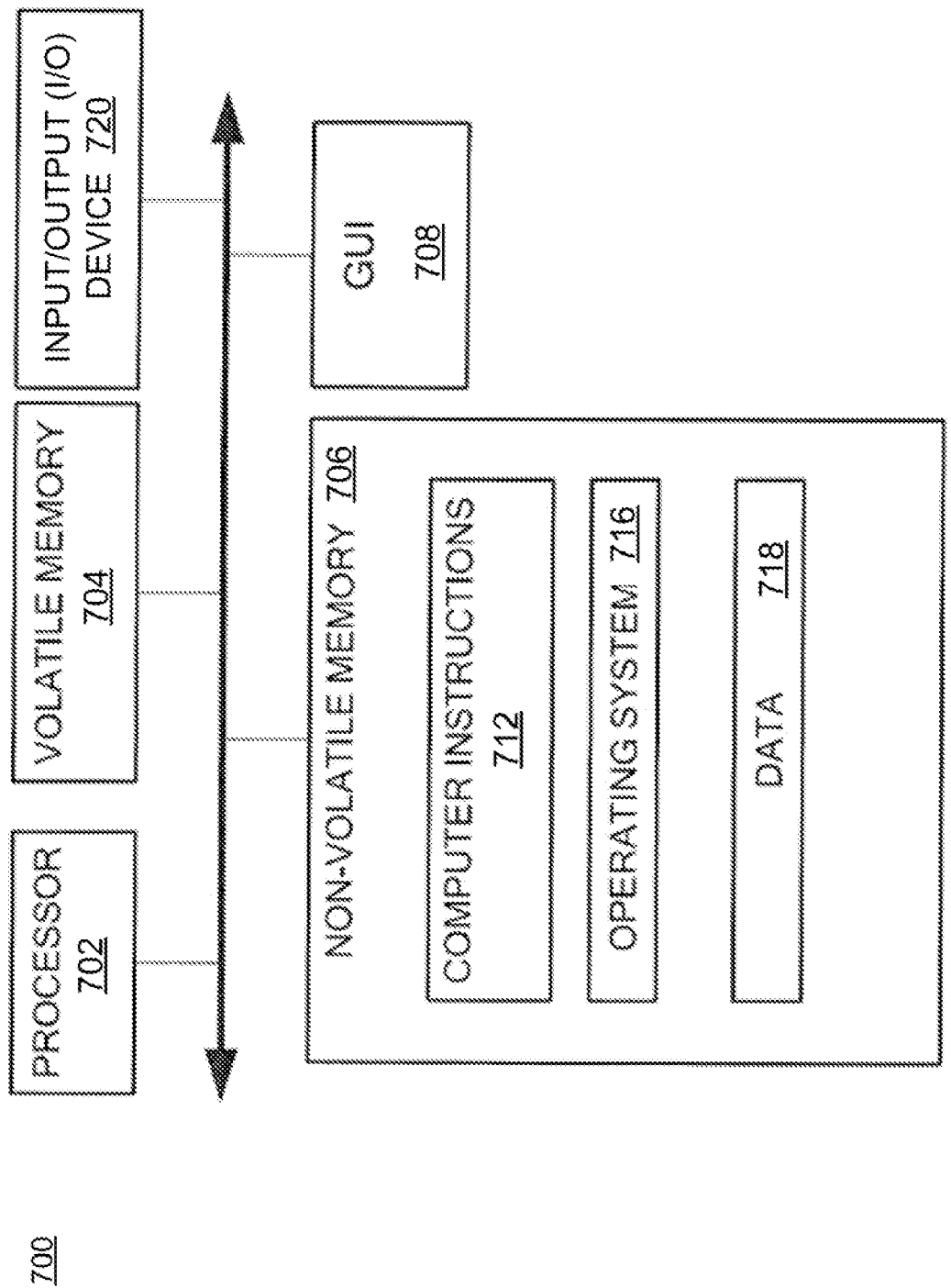
FIG. 7 is diagram of an example of a computing device, according to the prior art.

Referring to FIG. 7, computing device 700 may include processor 702, volatile memory 704 (e.g., RAM), non-volatile memory 706 (e.g., a hard disk drive, a solid-state drive such as a flash drive, a hybrid magnetic and solid-state drive, etc.), graphical user interface (GUI) 708 (e.g., a touchscreen, a display, and so forth) and input/output (I/O) device 720 (e.g., a mouse, a keyboard, etc.). Non-volatile memory 706 stores computer instructions 712, an operating system 716 and data 718 such that, for example, the computer instructions 712 are executed by the processor 702 out of volatile memory 704. Program code may be applied to data entered using an input device of GUI 708 or received from I/O device 720.

Processor 702 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

FIGS. 1-6, are provided as an example only. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
receiving, by an admission controller, a deployment object associated with code that is desired to be deployed to a production system;
detecting, by a first responder, whether the deployment object is associated with a change ticket and, when the deployment object is not associated with a change ticket, submitting a change ticket that is associated with the deployment object, the change ticket being submitted by the first responder, wherein the first responder is executed by the admission controller, the change ticket is obtained by the first responder after the deployment object is received by the admission controller, and the submission of the change ticket is performed based on information that is retrieved by the first responder from at least one of the deployment object or a configuration map that is associated with the deployment object;
detecting, by a second responder, whether the change ticket, that is associated with the deployment object, is allowed, and, when the change ticket is allowed, authorizing a deployment of the code, the deployment being authorized by the second responder; and
deploying the code to a production system when the deployment of the code has been authorized by the second responder, the code being deployed by the admission controller.

2. The method of claim 1, wherein the first responder and the second responder are invoked by the admission controller by using different webhooks, and the admission controller includes a process that is configured to: (i) detect a change request that is associated with the deployment object and (ii) process the deployment object by using the first responder and the second responder.

3. The method of claim 1, wherein the admission controller includes an admission controller for a container orchestration system that is configured to force registration of deployment objects with a change management system that is used by the container orchestration system, the registration of each deployment object being forced following a submission of change request that is associated with the deployment object.

4. The method of claim 1, further comprising, when the change ticket has not been allowed, putting the deployment object on hold by the second responder, wherein putting the deployment object on hold includes:
storing the deployment object in a buffer storage;
detecting whether the change ticket is allowed after the deployment object is stored in the buffer storage; and
when the change ticket is allowed, retrieving the deployment object from the buffer storage and triggering a deployment of the code to the production system by the admissions controller.

5. The method of claim 1, further comprising, when the change ticket has not been allowed, putting the deployment object on hold by the second responder, wherein putting the deployment object on hold includes:
storing the deployment object in a buffer storage;
detecting whether a moratorium on code deployments is over;
in response to detecting that a moratorium is over, retrieving the deployment object from the buffer storage and triggering a deployment of the code to the production system by the admissions controller.

6. The method of claim 1, further comprising, when the change ticket has not been allowed, putting the deployment object on hold by the second responder, wherein putting the deployment object on hold includes:
storing the deployment object in a buffer storage;
detecting whether installation window has started;
when the installation window has started, retrieving the deployment object from the buffer storage and triggering a deployment of the code to the production system by the admissions controller.

7. The method of claim 1, wherein the first responder includes a mutating responder and the second responder include a validating responder.

8. A system, comprising:
a memory; and
at least one processor operatively coupled to the memory, the at least one processor being configured to perform the operations of:
receiving, by an admission controller, a deployment object associated with code that is desired to be deployed to a production system;
detecting, by a first responder, whether the deployment object is associated with a change ticket and, when the deployment object is not associated with a change ticket, submitting a change ticket that is associated with the deployment object, the change ticket being submitted by the first responder, wherein the first responder is executed by the admission controller, the change ticket is obtained by the first responder after the deployment object is received by the admission controller, and the submission of the change ticket is performed based on information that is retrieved by the first responder from at least one of the deployment object or a configuration map that is associated with the deployment object;
detecting, by a second responder, whether the change ticket, that is associated with the deployment object, is allowed, and, when the change ticket is allowed, authorizing a deployment of the code, the deployment being authorized by the second responder; and
deploying the code to a production system when the deployment of the code has been authorized by the second responder, the code being deployed by the admission controller.

9. The system of claim 8, wherein the first responder and the second responder are invoked by the admission controller by using different webhooks, and the admission controller includes a process that is configured to: (i) detect a change request that is associated with the deployment object and (ii) process the deployment object by using the first responder and the second responder.

10. The system of claim 8, wherein the admission controller includes an admission controller for a container orchestration system that is configured to force registration of deployment objects with a change management system that is used by the container orchestration system, the registration of each deployment object being forced following a submission of change request that is associated with the deployment object.

11. The system of claim 8, wherein the at least one processor is further configured to perform the operation of, when the change ticket has not been allowed, putting the deployment object on hold by the second responder, wherein putting the deployment object on hold includes:
storing the deployment object in a buffer storage;
detecting whether the change ticket is allowed after the deployment object is stored in the buffer storage; and
when the change ticket is allowed, retrieving the deployment object from the buffer storage and triggering a deployment of the code to the production system by the admissions controller.

12. The system of claim 8, wherein the at least one processor is further configured to perform the operation of, when the change ticket has not been allowed, putting the deployment object on hold by the second responder, wherein putting the deployment object on hold includes:
storing the deployment object in a buffer storage;
detecting whether a moratorium on code deployments is over;
in response to detecting that a moratorium is over, retrieving the deployment object from the buffer storage and triggering a deployment of the code to the production system by the admissions controller.

13. The system of claim 8, wherein the at least one processor is further configured to perform the operation of, when the change ticket has not been allowed, putting the deployment object on hold by the second responder, wherein putting the deployment object on hold includes:
storing the deployment object in a buffer storage;
detecting whether installation window has started;
when the installation window has started, retrieving the deployment object from the buffer storage and triggering a deployment of the code to the production system by the admissions controller.

14. The system of claim 8, wherein the first responder includes a mutating responder and the second responder include a validating responder.

15. A non-transitory computer-readable medium storing one or more processor executable instructions, which, when executed by at least one processor, cause the at least one processor to perform the operations of:
receiving, by an admission controller, a deployment object associated with code that is desired to be deployed to a production system;

detecting, by a first responder, whether the deployment object is associated with a change ticket and, when the deployment object is not associated with a change ticket, submitting a change ticket that is associated with the deployment object, the change ticket being submitted by the first responder, wherein the first responder is executed by the admission controller, the change ticket is obtained by the first responder after the deployment object is received by the admission controller, and the submission of the change ticket is performed based on information that is retrieved by the first responder from at least one of the deployment object or a configuration map that is associated with the deployment object;

detecting, by a second responder, whether the change ticket, that is associated with the deployment object, is allowed, and, when the change ticket is allowed, authorizing a deployment of the code, the deployment being authorized by the second responder; and deploying the code to a production system when the deployment of the code has been authorized by the second responder, the code being deployed by the admission controller.

16. The non-transitory computer-readable medium of claim 15, wherein the first responder and the second responder are invoked by the admission controller by using different webhooks, and the admission controller includes a process that is configured to: (i) detect a change request that is associated with the deployment object and (ii) process the deployment object by using the first responder and the second responder.

17. The non-transitory computer-readable medium of claim 15, wherein the admission controller includes an admission controller for a container orchestration system that is configured to force registration of deployment objects with a change management system that is used by the container orchestration system, the registration of each deployment object being forced following a submission of change request that is associated with the deployment object.

18. The non-transitory computer-readable medium of claim 15, wherein:

the one or more processor executable instructions further cause the at least one processor to perform the operation of, when the change ticket has not been allowed, putting the deployment object on hold by the second responder, and putting the deployment object on hold includes:

storing the deployment object in a buffer storage;

detecting whether the change ticket is allowed after the deployment object is stored in the buffer storage; and when the change ticket is allowed, retrieving the deployment object from the buffer storage and triggering a deployment of the code to the production system by the admissions controller.

19. The non-transitory computer-readable medium of claim 15, wherein:

the one or more processor executable instructions further cause the at least one processor to perform the operation of, when the change ticket has not been allowed, putting the deployment object on hold by the second responder, and putting the deployment object on hold includes:

storing the deployment object in a buffer storage;

detecting whether a moratorium on code deployments is over;

in response to detecting that a moratorium is over, retrieving the deployment object from the buffer storage and triggering a deployment of the code to the production system by the admissions controller.

20. The non-transitory computer-readable medium of claim 15, wherein:

the one or more processor executable instructions further cause the at least one processor to perform the operation of, when the change ticket has not been allowed, putting the deployment object on hold by the second responder, and putting the deployment object on hold includes:

storing the deployment object in a buffer storage;

detecting whether installation window has started;

when the installation window has started, retrieving the deployment object from the buffer storage and triggering a deployment of the code to the production system by the admissions controller.

\* \* \* \* \*